United States Patent [19]

Schnyder et al.

[11] Patent Number: 5,105,554
[45] Date of Patent: Apr. 21, 1992

[54] INSTRUMENT FOR MEASURING AN OBJECT'S DIMENSIONS

[75] Inventors: Urs Schnyder, Bevilard; Robert Wüst, Courroux, both of Switzerland

[73] Assignee: Schnyder & Cie S.A., Bevilard, Switzerland

[21] Appl. No.: 626,947

[22] Filed: Dec. 13, 1990

[30] Foreign Application Priority Data

Dec. 14, 1989 [GH] Ghana ............... 04495/89

[51] Int. Cl.⁵ .......................................... G01B 5/14
[52] U.S. Cl. ......................... 33/783; 33/542; 33/812; 33/815
[58] Field of Search ............... 33/783, 800, 802, 811, 33/812, 815, 816, 817, 821, 790, 542, 784, 787, 791, 792, 806, 809, 810, 827

[56] References Cited

U.S. PATENT DOCUMENTS

| | | | |
|---|---|---|---|
| 1,231,934 | 7/1917 | Packet | 33/812 |
| 2,470,254 | 5/1949 | Lee | 33/542 |
| 2,523,469 | 9/1950 | Hubeck | 33/783 |
| 3,113,384 | 12/1963 | Keszler | 33/811 |
| 3,114,976 | 12/1963 | Räntsch | 33/791 |
| 3,200,501 | 8/1965 | Keszler | 33/812 |
| 4,092,781 | 6/1978 | Blake | 33/812 |
| 4,873,771 | 10/1989 | Wüst | 33/815 |

FOREIGN PATENT DOCUMENTS

| | | | |
|---|---|---|---|
| 486137 | 10/1929 | Fed. Rep. of Germany | 33/812 |
| 147569 | 12/1978 | Japan | 33/783 |

*Primary Examiner*—William A. Cuchlinski, Jr.
*Assistant Examiner*—C. W. Fulton
*Attorney, Agent, or Firm*—McGlew & Tuttle

[57] ABSTRACT

An instrument for measuring the dimensions of a rigid object (10) comprises a fixed member (1), a mobile member (2) slidably mounted on the fixed member, means for indicating the resulting measurement, and a locking device (3) allowing the mobile member (2) to be moved on the fixed member (1) to hold two bearing points (X, X') on the members in contact with the object (10) being measured with a substantially constant bearing force. The locking device comprises a first sleeve (20) slidably mounted on the mobile member (2) under the action of springs (24), and a second sleeve (30) slidably mounted on the fixed member (1) and inside which is a tipping ring (36) connected by a rod (40) to the first sleeve. The second sleeve (30), by acting on the first sleeve (20), enables loading the springs (24) to produce the bearing force when the instrument is in contact with the object (10) being measured. When the second sleeve is free, the first sleeve (20) retracts in response to the force produced by the springs and tips the ring (36) to jam it on the fixed member (1).

6 Claims, 4 Drawing Sheets

INSTRUMENT FOR MEASURING AN OBJECT'S DIMENSIONS

BACKGROUND OF THE INVENTION

The present invention concerns a precision measuring instrument for measuring dimensions of rigid objects, such as the diameter of a sphere or of a cylinder, or the side of a cube, i.e. for measuring the linear distance separating two points, two straight lines or two parallel planes of an object. Sliding calipers and micrometers are two well known examples of such instruments which in appropriate embodiments may also serve to measure inside dimensions such as the inner diameter of a tube.

Such an instrument basically comprises an elongate fixed member, a mobile member mounted for linear movement along the fixed member, each member further having a bearing element adapted to contact the object to be measured, and a measuring device, for example a vernier, that indicates the distance separating the parts of the two bearing elements that come to touch the object.

To take a measurement, firstly the bearing element of the fixed member must be brought into contact with the object to be measured, then the mobile member must be slid until its bearing element also comes into contact with the object. The contact between the bearing elements and the object must be maintained manually or by means of a locking device, and lastly the measured distance separating the contacting points of the two bearing elements must be read on the measuring device, this distance corresponding to the dimension being measured.

The invention concerns more particularly the locking device of such an instrument. In known instruments, such a locking device is, for example, made up of a locking screw which when actuated exerts a strong pressure between the fixed and mobile parts of the instrument, or of a manually-actuable lever which when released produces friction between the parts. Locking screws however have the drawback that if the instrument is not carefully manipulated and is moved away from its measuring position, the locking screw will produce large stresses on the bearing elements leading to a rapid wear thereof. The same applies to micrometers whose measuring and locking devices are made up of a micrometric screw that is liable to produce substantial pressures on the object to be measured. Friction-producing levers have the drawback that a precise measurement cannot be guaranteed because it is always possible for one of its parts to move relative to the other. These drawbacks become all the more serious as the difficulty of placing the instrument on the object in the best position for giving an exact measurement increases, for example for taking an inside measurement.

SUMMARY OF THE INVENTION

An object of the invention is to provide a precision measuring instrument of the aforementioned type which does not have these drawbacks.

To achieve this object, the instrument according to the invention is characterized in that the locking device is arranged to exert a substantially constant force between the fixed and mobile members, said force being oriented in the direction of relative movement of the members and acting in a direction tending to maintain the bearing elements in contact with the object to be measured.

An advantage of the invention is that the constant force produced by the locking device greatly facilitates use of the instrument by obviating the need to exert this force manually.

Another advantage of the invention, if the instrument is moved away from its measuring position, is to limit the constraints between the bearing elements and the object being measured to a relatively low constant force that is insufficient to cause any damage to the instrument or to an object in contact therewith.

BRIEF DESCRIPTION OF THE DRAWINGS

Other features and advantages of the invention will be seen from the following description made by way of non-limiting example with reference to the accompanying drawings which show an embodiment of such an instrument. In the drawings, where the same references relate to similar elements.

DETAILED DESCRIPTION

Figure 1:
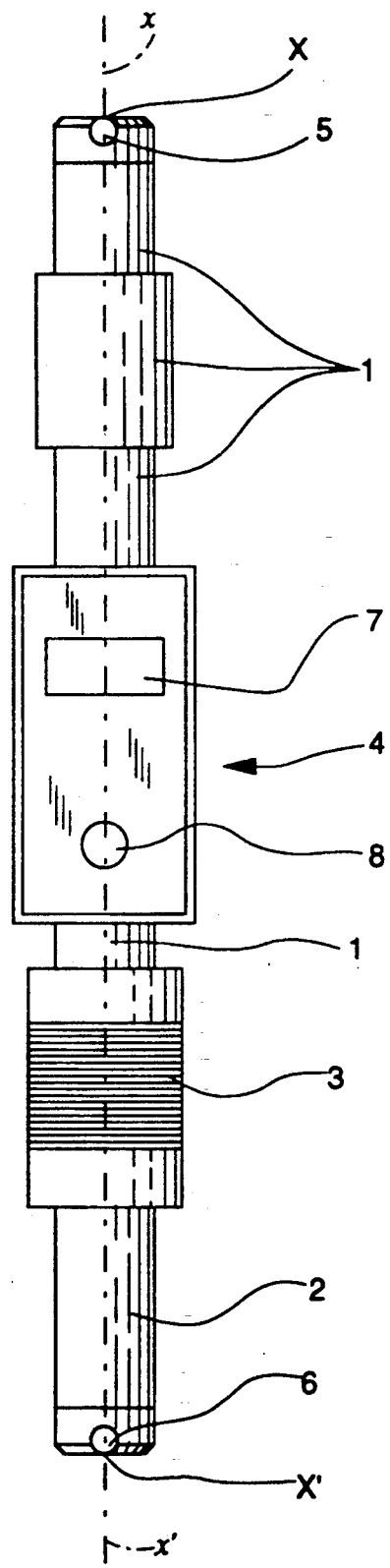
FIG. 1 is an overall view showing an instrument according to the invention for measuring internal measurements.

FIG. 1 is an overall view of an instrument according to the invention, comprising basically a fixed tubular member 1, a mobile tubular member 2 slidably mounted on member 1 parallel to a longitudinal axis of symmetry xx' common to members 1 and 2, a locking device 3 fixed to the member 2, and a measuring device 4 fitted on member 1. The free end of member 1 also has a bearing element 5, and the free end of member 2 a bearing element 6. Elements 5 and 6 are adapted to come into contact respectively at points X and X' with an object to be measured, not shown in FIG. 1, in order to take an inside measurement, for instance the inner diameter of a circular hole. The distance separating the points X and X' thus corresponds to the measurement, and this distance is precisely indicated by the measuring device 4.

In the illustrated example, device 4 comprises a digital display 7 that numerically indicates the result of the measurement, and a zero-setting button 8 for the display, by means of which the instrument can be calibrated. This device, which may include further operating means for example for displaying a pre-determined measurement, will not be described in detail because such devices are well known and widely used in metrology, especially in calipers. Of course, instead of the digital display device 4 other measuring devices could be used, such as for example a vernier or a comparator.

To place the instrument on an object to be measured, firstly point X must be applied against a given location of the object, then point X' is applied against another location of the object by shifting mobile member 2 on fixed member 1 in a direction tending to move bearing element 6 away from bearing element 5. This shifting is produced, e.g. by manually moving locking device 3 away from bearing element 5, this device 3 being designed so that when it is shifted there is no resistance to its movement on member 1 even though it remains fixed to member 2. When point X' has reached the selected location on the object being measured, the locking device 3, before being released, must still be slightly moved in the same direction as before, this extra movement serving to load the device under spring action and to lock the device on fixed member 1 thereby preventing it from retracting.

In the described conditions, the locking device 3, once loaded, exerts a substantially constant force between members and 2, for small variations of the distance separating points X and X'. This force is transmitted to bearing elements 5 and 6 making them contact evenly with the object being measured, this being a necessary condition to guarantee a precise measurement. To remove the instrument when the measurement has been taken, it suffices to move the locking device 3 rearwards by applying thereon a releasing force opposite to the force needed to load it, which releasing force unlocks the device 3 and tends to bring bearing elements 5 and 6 together.

As pointed out previously, if the instrument is slightly moved during the measurement, either accidentally or deliberately in order to position it correctly, the pressure exerted by the bearing elements against the object being measured will be held substantially constant by the locking device. This constitutes a substantial advantage over conventional instruments, for example those with a micrometer screw for adjusting the distance between the bearing elements, with which such a movement would either lead to a loss of contact between the instrument and the object being measured, or produce considerable stresses up to the limit of elastic or permanent deformation of the instrument or of the object.

The invention is particularly directed to the measuring instrument's locking device. This device and its operation will now be described in greater detail with reference to FIGS. 2a to d which show in cross-section a simplified embodiment of the instrument designed for taking internal measurements, with the instrument shown in different positions relative to an object being measured, namely a cylindrical tube made of metal or any other solid material arranged with its axis in the plane of the drawing.

Figure 2A:
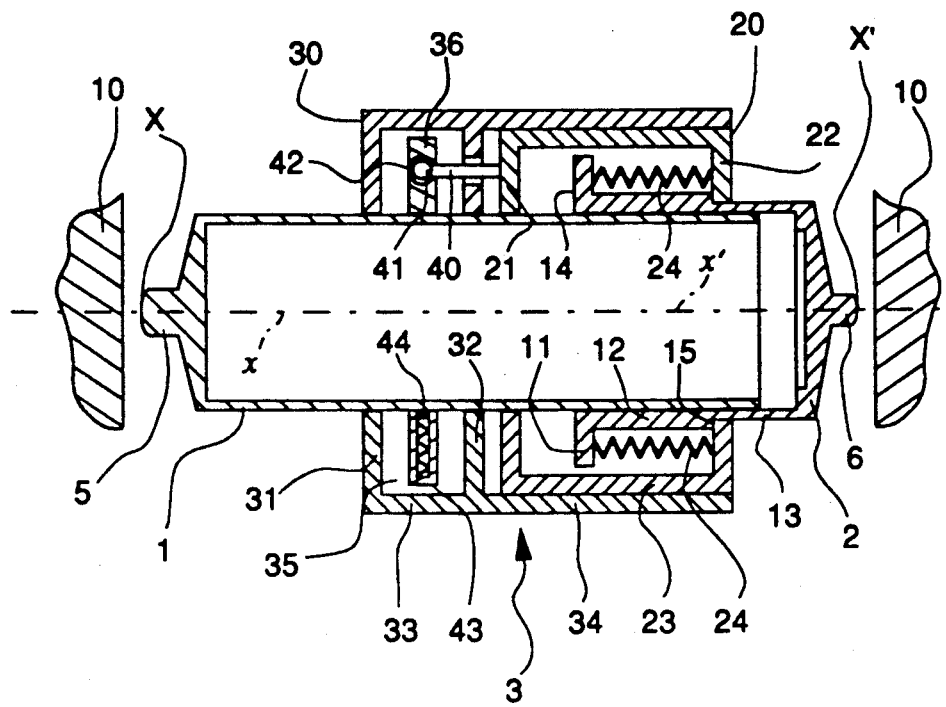
FIGS. 2 $a$ to $d$ are cross-sectional views of a simplified embodiment of the instrument according to the invention showing the principle of operation of the locking device.
Figure 2B:
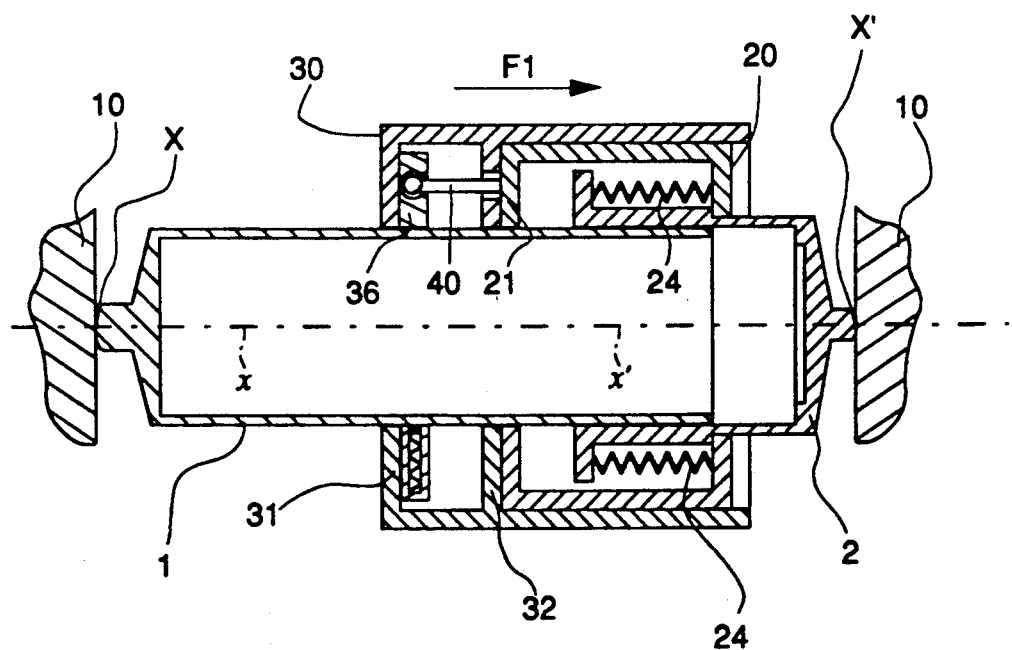

FIG. 2a shows the measuring instrument after it has been inserted in the cylinder of which only the internal surface 10 is shown, the instrument being out of contact with surface 10 at this stage. This Figure shows the fixed and mobile members 1 and 2, their longitudinal axis of symmetry xx' perpendicular to the non-indicated axis of the cylinder, the locking device 3 and the previously-described bearing elements 5 and 6; however, to simplify the drawing the measuring device 4 of known type is not shown.

Fixed member 1 is a cylindrical tube carrying at one end the bearing element 5 facing surface 10. On the outer face of member 1, adjacent its other end, is slidably mounted without play the mobile member 2 which is generally cylindrical and has a closed end forming the bearing element 6 facing cylinder surface 10.

The end of mobile member 2 mounted on fixed member 1 carries a flange 11 on a cylindrical part 12 whose outer diameter is greater than the outer diameter of the remaining part 13 of this member. The lateral face of flange 11 defining the end of member 2 forms a first abutment 14, and the ridge joining parts 12 and 13 forms a second abutment 15.

Locking device 3 basically comprises two cylindrical sleeves, whose axis of symmetry lies along xx', and a tiltable ring 36. The first sleeve, 20, comprises a first lateral wall 21 freely slidably mounted on fixed member 1, a second lateral wall 22 slidably mounted on part 13 of mobile member 1, and an outer cylindrical wall 23 joining walls 21 and 22 and passing freely over flange 14. Thus, the displacement of sleeve 20 on mobile member 2 is limited by the abutments 14 and 15 which respectively abut against walls 21 and 22. Furthermore, between flange 11 and second wall 22 are fitted springs 24 exerting a force tending to pull flange 11 towards wall 22, which thus bears against abutment 15 when the device is in the rest position.

Figure 2C:
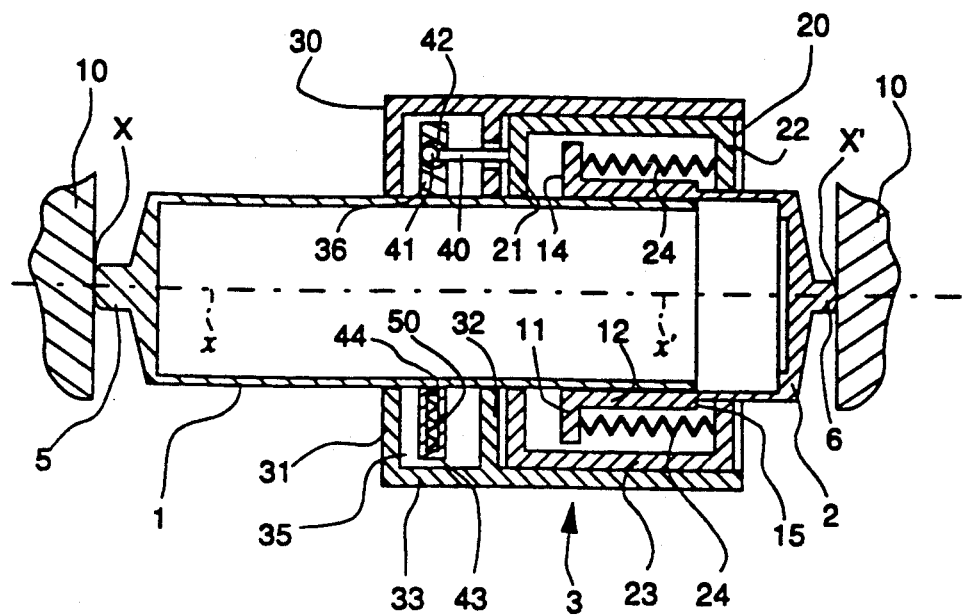

The second sleeve, 30, has a similar shape to sleeve 20. Thus, it has a first lateral wall 31 and a second lateral wall 32 both freely slidably mounted on fixed member 1, and an outer cylindrical wall 33 joining the walls 31 and 32. Wall 33 is further extended by a skirt 34 that in the rest position entirely covers first sleeve 20. Walls 31, 32 and 33 define, in sleeve 30, an internal cavity 35 in which the tiltable ring 36 is disposed on fixed member 1 perpendicular to axis xx'. Ring 36 is planar and has an inner diameter slightly greater than the outer diameter of member 1 so that it can be inclined on member 1 to an oblique position, as shown in FIG. 2c, by tilting about an axis perpendicular to the plane of the Figure and which intersects axis xx'.

Ring 36 is connected to the wall 21 of first sleeve 20 by means of a rigid rod 40 that passes freely through an aperture in wall 32 of second sleeve 30. Rod 40, without inhibiting the tilting motion of ring 36, transmits to the latter any translational displacement of first sleeve 20. For this purpose, rod 40 terminates with a spherical part 41 received with adequate play in a spherical cavity 42 of ring 36. Advantageously, ring 36 also comprises a friction device having a spring 43 producing at a point 44 diametrically opposite cavity 42, a friction between ring 36 and fixed member 1.

Thus, a translational displacement of first sleeve 20 (less the play between spherical part 41 and cavity 42) is transmitted to ring 36. Because of friction produced at point 44 between ring 36 and fixed member 1, this displacement produces tilting of ring 36 causing it to lock by jamming on member 1. Once ring 36 is locked, the translational displacement of sleeve 20 is obviously also stopped.

Of course, second sleeve 30 is free to move relative to first sleeve 20 over a distance equal to the internal distance separating wall 31 from wall 32, less the thickness of ring 36. Moreover, the length of rod 40 is advantageously selected so that when wall 31 is in contact with ring 36, wall 32 contacts wall 21. Whereas it is essential for wall 31 to be able to contact ring 36, it is not absolutely necessary for the walls 21 and 32 to be able to come into contact.

The measuring instrument is placed by exerting a manual force F1 (FIG. 2b) between fixed member 1, held in one hand, and sleeve 30, held in the other hand. Force F1 is parallel to axis xx' and is directed so as to slide mobile member 2 on fixed member 1 until points X and X' come to contact surface 10. Such movement is always possible because even if ring 36 is initially tilted obliquely, wall 31, by bearing against ring 36, will bring it to its position perpendicular to axis xx' in which it offers no resistance against translational displacement. Force F1 is thus initially transmitted to first sleeve 20 by wall 32 if the latter bears against wall 21, otherwise by rod 40. Force F1 then acts on mobile member 2 via springs 24 whose tension is selected to overcome any friction between the mobile and fixed members 1, 2.

Once points X and X' are in contact with surface 10, the exerted force F1 must be increased. This produces displacement of first sleeve 20 on mobile member 2, moving wall 22 away from abutment 15, as illustrated in FIG. 2c, thereby increasing the tension of springs 24. The position of sleeve 20 on mobile member 2 determines the tension of springs 24 and consequently the force with which bearing elements 5, 6 contact surface 10.

Force F1 can then be removed by releasing second sleeve 30. Under the action of springs 24, first sleeve 20 thus moves back slightly by the distance needed to tip ring 36 via rod 40 by means of friction point 44. In this position of ring 36, shown in FIG. 2c, sleeve 20 can no longer retract, as explained above. Measurement of the tube's diameter can thus take place in optimal conditions.

Figure 2D:
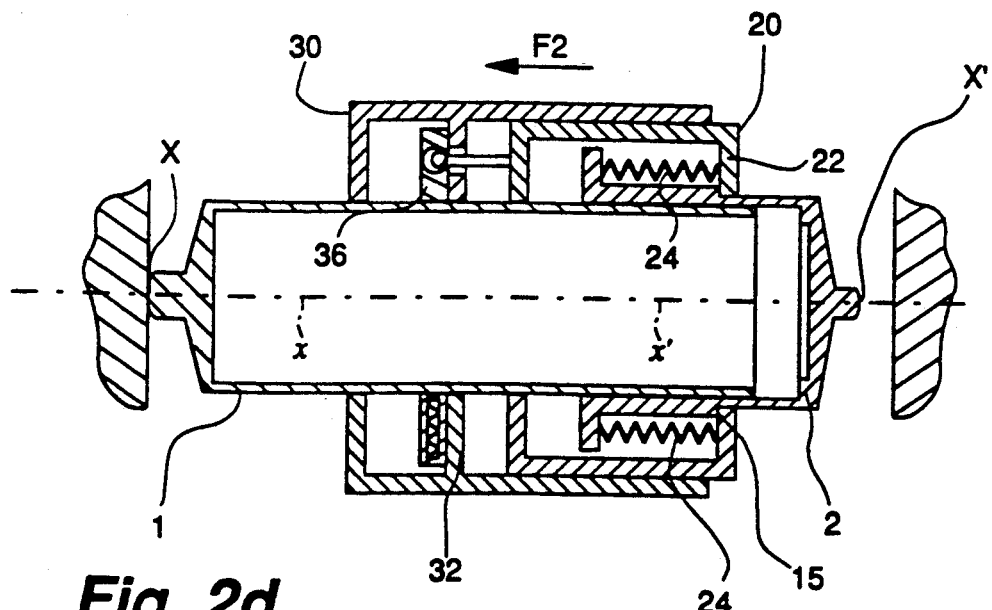

To release the instrument, it suffices to apply on second sleeve 30 a force F2 opposite to force F1, as shown in FIG. 2d. Under the action of force F2, sleeve 30 moves freely until its second wall 32 abuts ring 36 at a point 50 (see FIG. 2c) diametrically opposite cavity 42. If the strength of force F2 is then increased sufficiently, wall 32 will move ring 36 back perpendicular to axis xx'. In this position, ring 36 does not resist displacement of first sleeve 20 on fixed member 1. Sleeve 20 will thus move under the action of the force produced by springs 24 until its second lateral wall 22 abuts against abutment 15 of mobile member 2. The instrument can then be adjusted to a suitable length so it can easily be removed from the tube.

Figure 3:
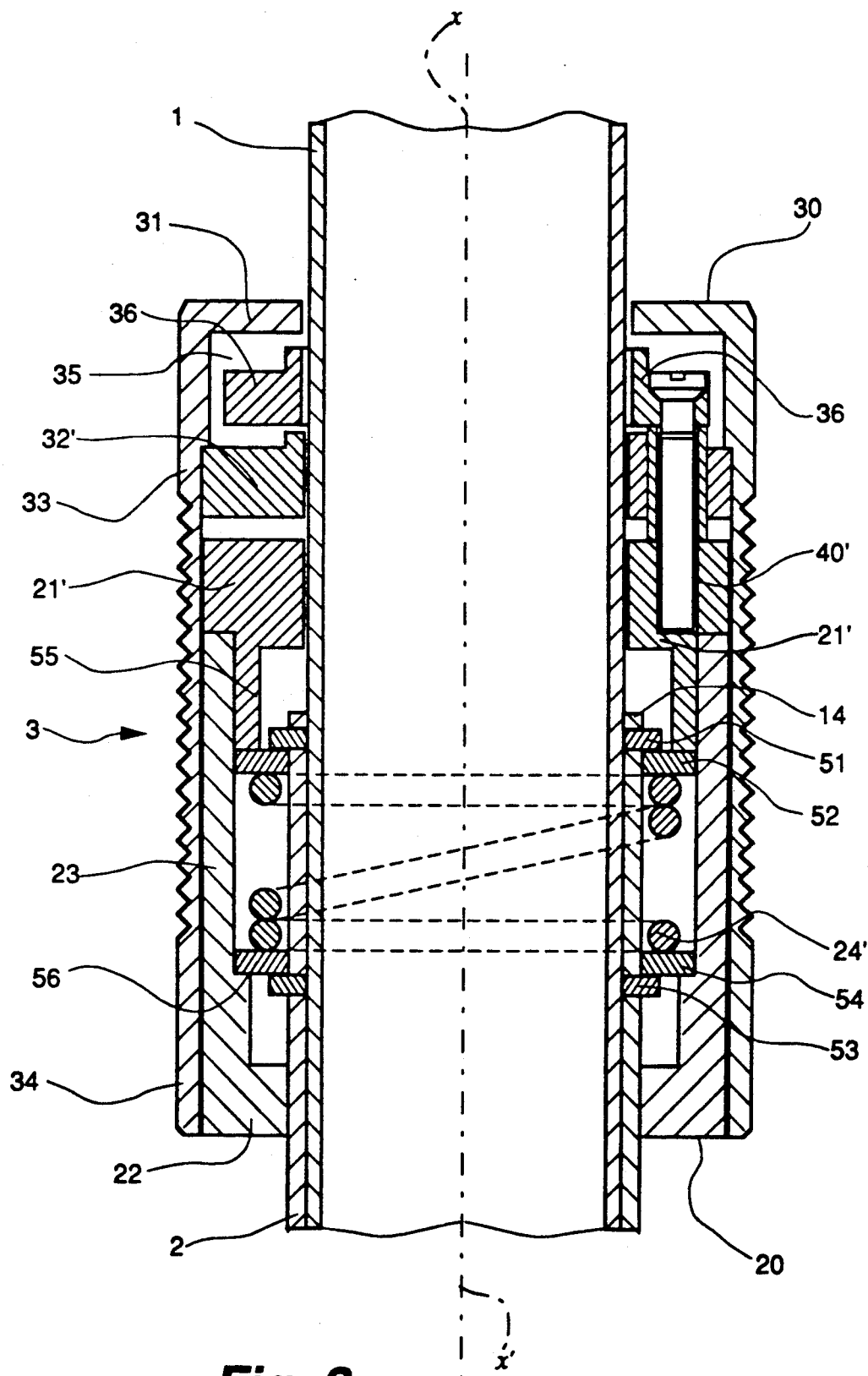
FIG. 3 shows a particularly advantageous embodiment of the locking device.

A particularly advantageous industrial embodiment of the locking device according to the invention is shown in FIG. 3, wherein elements similar to those of FIGS. 2 a to d are designated by the same references but with a prime (').

This embodiment is basically distinguished over the previously-described one by constructional details of the sleeves enabling them to be easily mounted on the fixed and mobile members 2, and by the use of a single compression spring.

First sleeve 20 thus has a lateral wall 21', similar to wall 21, force-fitted inside cylindrical wall 23. In second sleeve 30, lateral wall 32 is made of a wall 32' tightly fitted inside cylindrical wall 33. In this embodiment, rod 40 is replaced by a screw 40' whose head is received with ample play in a recess of ring 36. The latter does not have a friction device because the inherent friction against fixed member 1 suffices to make it tip. Mobile member 2 has two grooves with a resilient ring 51 fitted in the first and a similar ring 53 in the second. Between these rings are two washers 52 and 54, washer 52 bearing against ring 51 and against an extension 55 of wall 21', and washer 54 bearing against ring 53 and against a shoulder 56 of wall 23. Lastly, a compressed helical spring 24' is fitted around mobile member 2 between rings 52 and 54.

The locking device of FIG. 3 responds to forces F1 and F2 exactly like the device of FIG. 2, the principal difference being that spring 24' operates in compression mode when force F1 acts on sleeve 30, whereas in the same conditions springs 24 operate in extension mode.

Of course, the described locking device may undergo various modifications that are self evident to persons skilled in the art, leading to different embodiments but without departing from the scope of the invention.

We claim:

1. An instrument for measuring a dimension of a rigid object, the instrument comprising:

a fixed member having a first bearing element;

a mobile member mounted for linear movement along the fixed member and having a second bearing element;

measuring means connected with one of said fixed member and said mobile member, said measuring means for indicating a distance separating said first bearing element from said second bearing element, said distance being equal to the dimension being measured; and, locking means connected to one of said fixed and mobile members for displacing said mobile member with respect to said fixed member in a direction for bringing said bearing elements in contact with said object at a fixed bearing force, for assuming a relaxed position exerting a substantially constant force equal to said fixed bearing force between said fixed member and said mobile member for maintaining the bearing elements in contact with the object, and for removing said force between said fixed member and said mobile member upon forced displacement of said locking device, in a direction opposite to said direction, for disengaging contact of said first bearing element and said bearing element from said object.

2. An instrument according to claim 1, wherein said fixed member and said mobile member are each formed of substantially straight tubes having a common longitudinal axis, said mobile member being mounted on said fixed member for sliding movement thereon, parallel to said common longitudinal axis, said first bearing element being fixed to said fixed member and said second bearing element being fixed to said mobile member, said locking means comprising:

a first sleeve having a first lateral wall and a second lateral wall and an outer wall, said first lateral wall being slidably mounted on said fixed member and said second lateral wall being slidably mounted on said mobile member, said mobile member including two abutments limiting an extent of displacement of said first sleeve, including a first abutment that abuts with one lateral wall and a second abutment that abuts with another lateral wall;

constant force means for producing a substantially constant force, said substantially constant force being applied between said mobile member and said first sleeve in a direction parallel to said common longitudinal axis for maintaining said bearing elements in contact with said object;

a second sleeve having a first lateral wall and a second lateral wall, said first lateral wall and said second lateral wall being slidably mounted on said fixed member and an outer wall providing a holding surface for displacing said mobile member with respect to said fixed member;

a clamping device positioned between said second sleeve first lateral wall and said second lateral wall for coming into contact with one of said first lateral wall and said second lateral wall, said clamping device being positionable in either a neutral position, in which said clamping device is movable along said fixed member in the direction of said common longitudinal axis or a jammed position in which said clamping device is fixed with respect to said fixed member; and a connection member positioned between said first sleeve and said clamping device, said first sleeve acting on said connection member to place a clamping device in said jammed position and said second sleeve acting on said clamping device to place said clamping device in said neutral position.

3. An instrument according to claim 2, wherein the force-producing means comprise a resilient member (24; 24') producing said substantially constant force in response to slight deformations thereof relative to its nominal deformation.

4. An instrument according to claim 2 wherein a part (34) of the second sleeve (30) fits over the first sleeve (20).

5. An instrument according to claim 2 wherein said locking device comprises a ring (36) fitted around the fixed member (1) so as to be able to tip about an axis perpendicular to said longitudinal axis (xx') under the action of said connecting member (40; 40') into an oblique position in which the ring is jammed on said fixed member, the ring being disengaged from its jammed position by movement of the second sleeve (20) until one of its lateral walls abuts the ring to bring it perpendicular to said longitudinal axis (xx').

6. An instrument according to claim 5, wherein said ring (36) further comprises means (43) for producing friction against the fixed member to facilitate tipping of the ring.

* * * * *